United States Patent [19]

Vitous

[11] 4,178,842
[45] Dec. 18, 1979

[54] CANTILEVERED INSTANTANEOUS HEATING BREWER

[75] Inventor: Charles J. Vitous, Berwyn, Ill.

[73] Assignee: Cory Food Services, Inc., Chicago, Ill.

[21] Appl. No.: 930,813

[22] Filed: Aug. 2, 1978

[51] Int. Cl.² ........................................... A47J 31/10
[52] U.S. Cl. ..................................... 99/281; 99/295; 99/304
[58] Field of Search ................. 99/280, 281, 282, 288, 99/291, 295, 300, 307, 316, 304

[56] References Cited

U.S. PATENT DOCUMENTS

| 3,385,201 | 5/1968 | Martin | 99/282 |
| 3,443,508 | 5/1969 | Reynolds | 99/282 |
| 3,463,075 | 8/1969 | Wickenberg | 99/282 |

Primary Examiner—Robert W. Jenkins
Attorney, Agent, or Firm—Wegner, Stellman, McCord, Wiles & Wood

[57] ABSTRACT

A cantilevered instantaneous heating brewer for brewing beverages, such as coffee, wherein the heat transfer structure includes a heavy heat transfer mass. Cold water is supplied to the heat transfer mass to have heat transfer association therewith and thereby be heated to the desired brewing temperature. The mass is disposed in overlying relationship to a rear upright portion of the brewer housing so as to provide a stable arrangement of the brewer as against undesirable forward tipping. To further minimize the tendency for tipping of the cantilevered arrangement, the brewing cartridge normally carried on the front portion of the cantilevered head is made to be relatively lightweight. In the illustrated embodiment, the heat transfer structure includes a plurality of stacked relatively heavy massive elements with the stack being disposed at the rear of the head overlying the rear upright portion of the housing. The base of the housing may extend forwardly of the head so as to provide further stability in the brewer.

9 Claims, 2 Drawing Figures

U.S. Patent  Dec. 18, 1979  4,178,842
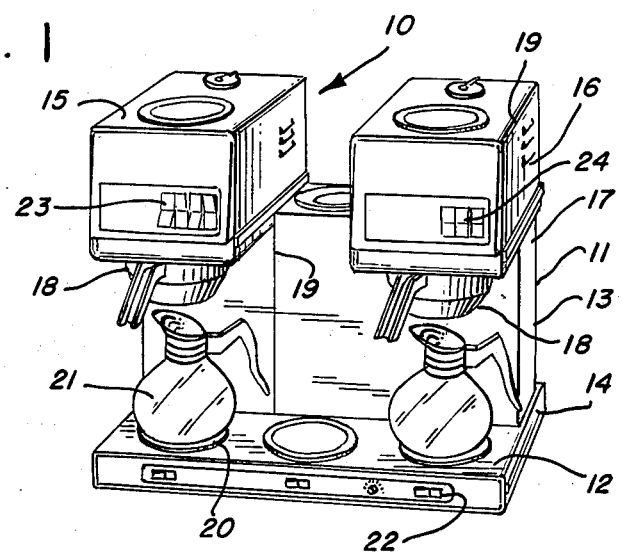
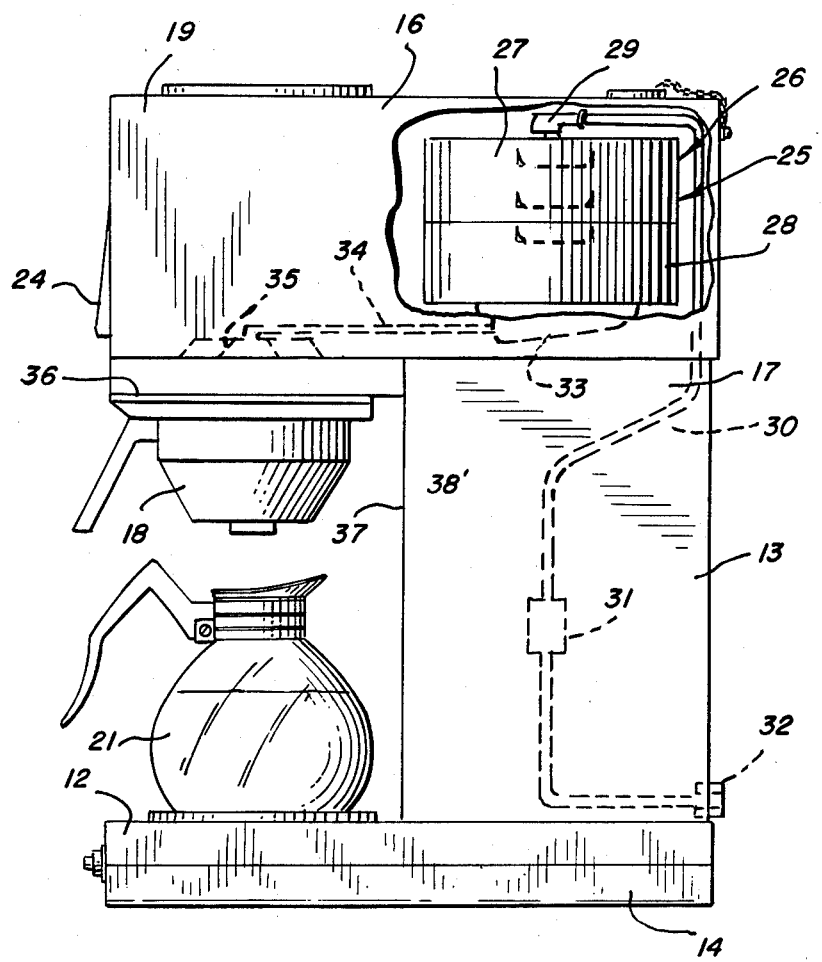

CANTILEVERED INSTANTANEOUS HEATING BREWER

BACKGROUND OF THE INVENTION

1. Field of the Invention

This invention relates to beverage brewers, and in particular to beverage brewers of the instantaneous heating type wherein the hot beverage brewing liquid is heated to the brewing temperature substantially concurrently with the delivery of the water to the device.

2. Description of the Prior Art

In one conventional form of beverage brewing apparatus suitable for brewing coffee and the like, the beverage is brewed in a cartridge which is supported on a forwardly cantilevered head portion of the brewer housing. A base portion carries the head on the upper end of a rear upright portion. The base portion is adapted to carry a decanter or the like for receiving the brewed beverage from the brewing cartridge and may be disposed on a suitable warmer to maintain the delivered brewed beverage at the serving temperature after it is received in the decanter.

In one improved form of beverage brewer, the water is heated to the brewing temperature as it is delivered from a source of cold water, such as from a conventional pressurized water supply. In effecting the transfer of heat to the thusly conducted cold water, it is desirable to provide optimum heat transfer conditions. In one improved form of such a beverage brewer, the heat transfer is effected by means of a heat transfer body which is heated by a suitable heating means, such as an electrical heating element, the incoming cold water being arranged to flow in heat transfer association with the body which acts as a heat reservoir in mediating the heat transfer to the water for improved heating thereof to the desired brewing temperature.

The provision of such a heat transfer body presents a serious problem in that the body is relatively massive. In the conventional prior art structures, the heat transfer body has been disposed in overlying relationship to the cartridge for facilitated delivery of the hot brewing water therefrom into the cartridge. This has presented the possibility of forward tilting of the brewer as a result of additional downward forces being applied to the forwardly cantilevered portion of the brewing head.

SUMMARY OF THE INVENTION

The present invention comprehends an improved beverage brewer structure wherein the relatively massive heat transfer body is disposed so as to cause the center of gravity of the brewer to be disposed rearwardly of the forwardly cantilevered portion of the head.

More specifically, in the illustrated embodiment, the brewer defines a rear upright support portion which supports the forwardly cantilevered head at the rear portion thereof. The heat transfer body is disposed within the portion of the head overlying the support so as to effectively place the center of gravity of the entire brewer substantially rearwardly of the forwardly cantilevered portion of the head.

In the illustrated embodiment, the center of gravity of the brewer is disposed on a line extending vertically upwardly through the rear upright portion of the brewer.

Further, in the illustrated embodiment, the heat transfer body is disposed in fully overlying relationship to the upright support portion of the brewer, and more specifically, is spaced rearwardly of the front surface thereof.

In the illustrated embodiment, the heat transfer body is comprised of a plurality of separate elements, each of which comprises a massive heat transfer body element. The individual heat body elements are disposed in stacked relationship so as to effectively define a composite heat body. In the illustrated embodiment, two such stacked elements are provided, it being obvious that any number thereof may be utilized as desired. By utilizing a plurality of such heat transfer elements, the incoming cold water may be successively heated to the final brewing temperature with optimum efficiency in the heat transfer process.

The delivery of the hot water at the desired brewing temperature may be effected by means of a conduit extending forwardly from the rearwardly disposed heat transfer body to the brewing cartridge disposed on the forwardly cantilevered portion of the brewer head.

In the illustrated embodiment, the brewing cartridge is preferably formed of a lightweight material so as to further effectively minimize the weight of the brewer apparatus at the forwardly cantilevered portion, thereby effectively maintaining the center of gravity as desired in the rear portion of the brewer for improved stability thereof in use.

Thus, the beverage brewer of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a perspective view of a beverage brewer having heat transfer means embodying the invention; and FIG. 2 is a fragmentary side elevation thereof with a portion broken away to facilitate illustration of the invention.

DESCRIPTION OF THE PREFERRED EMBODIMENT

In the exemplary embodiment of the invention as disclosed in the drawing, a beverage brewer generally designated 10 is shown to comprise a coffee brewer having an outer housing 11 including a base portion 12, an upright rear portion 13 upstanding from a rear portion 14 of the base 12, and a pair of brewing heads 15 and 16 cantilevered forwardly from the upper end 17 of the upright 13 and adapted to removably support a brewing cartridge 18 in the forwardly cantilevered portion 19 thereof. The base is provided with a plurality of warmer stations 20 adapted to support removably a plurality of decanters 21 for receiving the brewed coffee and maintaining the received coffee at serving temperature as desired. The brewer may further include suitable controls 22 on the base 12 and controls 23 and 24 on the heads 15 and 16, respectively, for controlling operation of the apparatus in normal use, in the conventional manner.

As indicated above, the invention herein is concerned with the means for providing the hot brewing water to the brewing cartridges 18. As further indicated above, in the beverage brewers of the present invention, the heating of the water is effected by "instantaneous-type" heating means generally designated 25. The heating means, as best shown in FIG. 2, comprises a heat transfer body generally designated 26 which, in the illustrated embodiment, includes a plurality of individual heat transfer body elements 27 and 28 arranged in stacked association so as to define cumulatively the desired heat transfer body suitable for heating the incoming cold water to the desired brewing temperature.

The cold water may be delivered to the heat body 26 through an inlet fitting 29 which is connected through a suitable conduit 30 and suitable valve control means 31 to a inlet connector 32 which may be adapted to connect to a conventional pressurized power supply line, such as in a conventional business office or home. As shown in FIG. 2, connector 29 is connected to the top of the uppermost heat transfer body 27.

The hot brewing water is delivered from the lowermost heat transfer body 28 through an outlet connector 33 and a forwardly extending conduit 34 which, in the illustrated embodiment, comprises a hose formed of suitable synthetic resin to a spray head 35 carried on the bottom wall 36 of the forwardly cantilevered portion 19 of the brewer head.

As seen in FIG. 2, upright portion 13 of the housing 11 defines a front wall 37. The forwardly cantilevered portion 19 of the brewing heads extends forwardly from the upright projection of the front wall 37. As seen in FIG. 2, the heat transfer body 26 is disposed fully in overlying relationship to the support portion 13, and more specifically, rearwardly of the upright projection of the front wall 37 thereof.

Further, more specifically, the brewer 10 is preferably arranged so that the center of gravity thereof lies on a vertical line 38 disposed rearwardly of the forward wall 37 of upright 13 and, thus, in a line extending upwardly through the upright 13 and the rear portion of the head.

The heat transfer body elements 27 and 28 are individually massive elements so that a substantial weight is provided in the heat transfer body 26 in the rear portion of the brewer so as to overcome any tendency of the brewer to be tipped forwardly as by application of force downwardly on the cantilevered portion 19 of the brewing heads. Thus, the arrangement of the heat transfer body in the present invention provides an improved stability in the brewer maximizing safety in the use thereof and providing a substantial improvement over the devices of the prior art.

The hot water transfer duct 34 is preferably formed of a lightweight synthetic resin so as to again effectively minimize the amount of weight carried by the cantilevered portion 19 of the brewing heads. Similarly, the brewing cartridges 18 may be formed of a lightweight synthetic resin so as to effectively minimize the weight thereof supported on the cantilevered forward portions 19.

In the normal brewing operation, the hot water is flowed through the brewing cartridge 18 downwardly into the receiving decanter 21 so that during the brewing operation, a substantial weight is brought downwardly onto the base 12 to further assist in the stabilizing of the brewer in the normal use thereof.

In the illustrated embodiment, the hot water delivery conduit extends generally horizontally forwardly from the lowermost heat transfer body element 28 to permit the desired disposition of the heat transfer body in the rear portion of the brewer and the disposition of the brewing cartridge in the forward portion of the brewer. At the same time, the conduit 34 is directed somewhat downwardly to assure a complete draining of the hot water from the hot water supply means 25 at the conclusion of the brewing operation.

As indicated above, the heat transfer body may include one or more individual heat transfer elements, the stacked pair of elements being shown for illustrative purposes.

The foregoing disclosure of specific embodiments is illustrative of the broad inventive concepts comprehended by the invention.

I claim:

1. In a beverage brewer having a base defining a rear portion, an upright upstanding from said base rear portion, and a head having a rear portion mounted to the top of said upright and cantilevered forwardly from the upper end of the upright to overlie the base, said head further defining a front portion, and means on said front porin of the head for removably supporting a brewing cartridge thereunder, an improved structural arrangement for delivering hot brewing water to the cartridge comprising:

massive heat transfer means mounted in said head at said rear portion thereof fully above said brewing cartridge and defining an effectively instantaneous heat transfer device;

means for delivering cold water to said heat transfer means to be heated by heat transfer association therewith to a preselected hot brewing temperature; and conduit means extending forwardly from said heat transfer means to the cartridge for delivering the hot brewing water from said heat transfer means into the cartridge for brewing a beverage in the cartridge.

2. The beverage brewer of claim 1 wherein a cartridge formed of a low weight synthetic resin material is provided for effectively minimizing the weight carried by said front portion of the brewer head in effecting a brewing operation.

3. The beverage brewer of claim 1 wherein said conduit means extend generally horizontally.

4. The beverage brewer of claim 1 wherein said heat transfer means defines an outlet opening substantially horizontally therefrom, said conduit means extending from said outlet to said cartridge.

5. The beverage brewer of claim 1 wherein said heat transfer means includes a plurality of individual massive stacked elements defining means for sequentially heating the brewing water to a desired brewing temperature.

6. The beverage brewer of claim 1 wherein said heat transfer means is disposed fully directly above said upright.

7. The beverage brewer of claim 1 wherein said upright defines a front vertical surface and said heat transfer means is spaced rearwardly of the upright projection of said vertical surface.

8. The beverage brewer of claim 1 wherein the center of gravity of the brewer is disposed on a vertical line extending within said upright.

9. In a beverage brewer having a base defining a rear portion, an upright upstanding from said base rear portion, and a head having a rear portion mounted to the top of said upright and cantilevered forwardly from the upper end of the upright to overlie the base, said head further defining a front portion, and means on said front portion of the head for removably supporting a brewing cartridge, an improved structural arrangement for delivering hot brewing water to the cartridge comprising:
- a massive heat transfer body mounted at said rear portion of said head;
- means for delivering cold water to said heat transfer means to be heated by heat transfer association therewith to a preselected hot brewing temperature; and
- conduit means extending forwardly from said heat transfer body to the cartridge for delivering the hot brewing water from said heat transfer body into the cartridge for brewing a beverage in the cartridge, said heat transfer body including a plurality of individual massive stacked elements arranged for sequentially heating the brewing water to a desired brewing temperature, the lowermost of said stacked elements defining an outlet and said conduit means extending from said outlet to said cartridge.

* * * * *